March 12, 1968 L. JULIE 3,373,392
RESISTANCE AND CONDUCTANCE REFERENCE DECADE STANDARD
Original Filed Dec. 23, 1963 8 Sheets-Sheet 1

INVENTOR.
LOEBE JULIE
BY
ATTORNEY

INVENTOR.
LOEBE JULIE

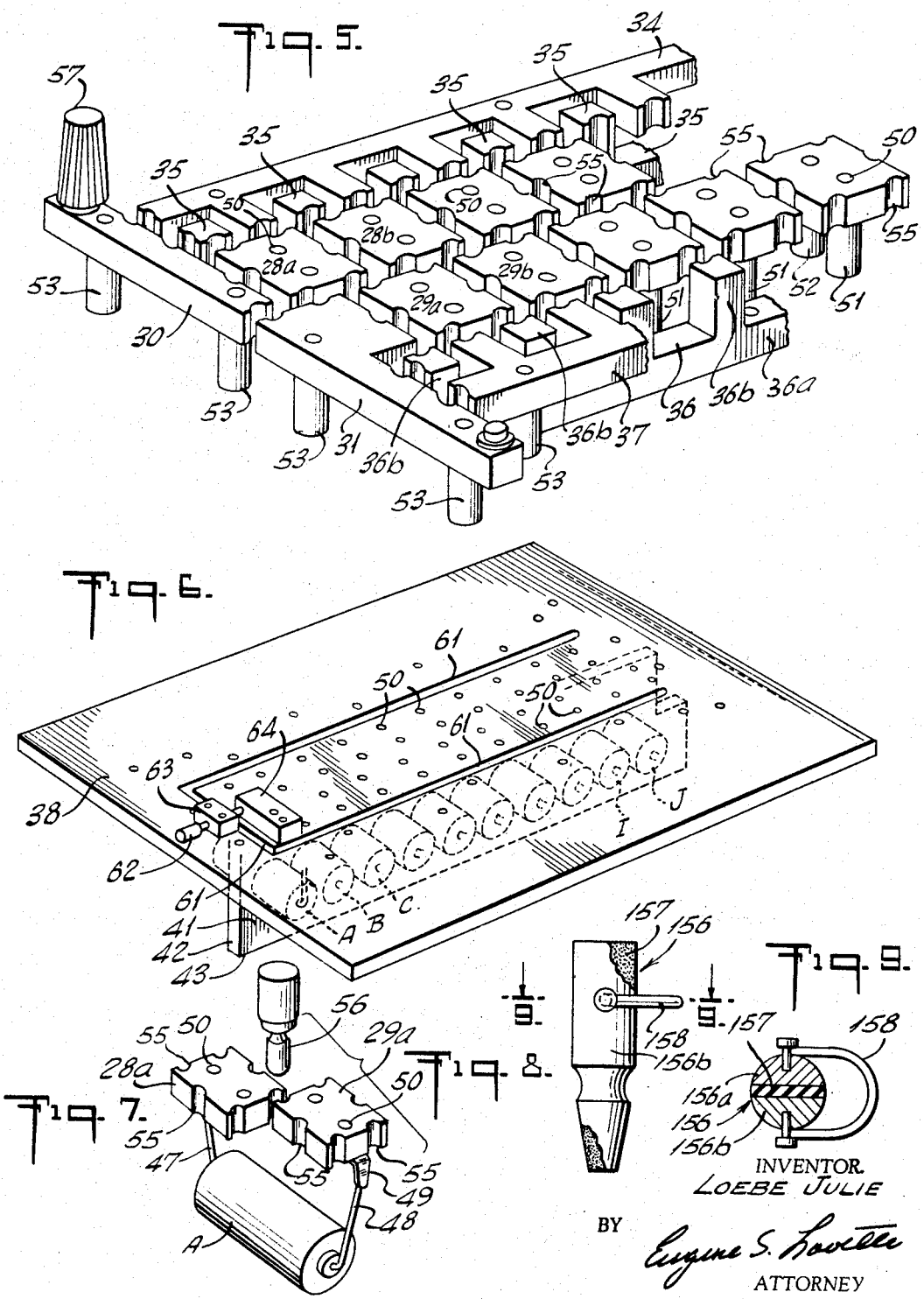

March 12, 1968 L. JULIE 3,373,392
RESISTANCE AND CONDUCTANCE REFERENCE DECADE STANDARD
Original Filed Dec. 23, 1963 8 Sheets-Sheet 5

INVENTOR.
LOEBE JULIE
BY Eugene S. Lovella
ATTORNEY

March 12, 1968  L. JULIE  3,373,392
RESISTANCE AND CONDUCTANCE REFERENCE DECADE STANDARD
Original Filed Dec. 23, 1963  8 Sheets-Sheet 6

INVENTOR.
LOEBE JULIE
BY
ATTORNEY

March 12, 1968    L. JULIE    3,373,392
RESISTANCE AND CONDUCTANCE REFERENCE DECADE STANDARD
Original Filed Dec. 23, 1963    8 Sheets-Sheet 7

INVENTOR.
LOEBE JULIE
BY
Eugene S. Lovett
ATTORNEY

March 12, 1968  L. JULIE  3,373,392

RESISTANCE AND CONDUCTANCE REFERENCE DECADE STANDARD

Original Filed Dec. 23, 1963  8 Sheets-Sheet 8

INVENTOR.
LOEBE JULIE
BY Eugene S. Lovette
ATTORNEY

United States Patent Office 3,373,392
Patented Mar. 12, 1968

3,373,392
RESISTANCE AND CONDUCTANCE REFERENCE DECADE STANDARD
Loebe Julie, Riverdale, N.Y., assignor to Julie Research Laboratories, Inc., New York, N.Y., a corporation of New York
Continuation of application Ser. No. 332,713, Dec. 23, 1963. This application Mar. 13, 1967, Ser. No. 648,176
16 Claims. (Cl. 338—77)

ABSTRACT OF THE DISCLOSURE

An impedance decade standard wherein precision and stability inaccuracies due to spurious leakage and contact resistances are minimized by a novel terminal plug block structure. The individual impedance elements of the standard are connected to correlated terminal blocks. The terminal blocks are raised in air with respect to the supporting insulator base. Also the blocks are isolated by surrounding air gap in the insulator base from the outer housing and ground connections. In addition the blocks arranged in novel positional array which increases the versatility of the standard as well as increasing its precision and stability.

Description

This application is a continuation of Ser. No. 332,713 filed Dec. 23, 1963 now abandoned entitled, A Resistance and Conductance Reference Decade Standard, and in the name of Loebe Julie.

The instant invention relates to an improved resistance and conductance reference decade standard for electrical use. In addition, such standard may be used as a highly accurate resistance or conductance for ratio transfer purposes, such as a voltage divider or voltbox, or for the purpose of calibrating electrical parameters and other electrical devices.

In view of the purposes contemplated for the above-described structure, extreme efforts have been exerted to achieve precision and stability characteristics of extremely high accuracies. In recent years, techniques have been developed which allow such devices to achieve accuracies within a few parts per million. Nevertheless, even accuracies of such magnitudes are often inadequate for many applications. There are numerous factors which have limited the improvement of greater accuracies for resistance and conductance reference decade standards. The ambient effects, such as humidity, temperature variations and other atmospheric variations, have been eliminated by encapsulating the resistor elements constituting the standard in hermetically sealed structures. Furthermore, inaccuracies due to self-heating and mechanical and structural stresses and strains have been eliminated by encapsulating the hermetically sealed resistor elements in oil baths. In spite of these severe precautions, the attainment of greater standard accuracies continue to elude the art because of the persistence of leakage resistance inaccuracies and contact resistance inaccuracies.

The inventions herein are concerned with the latter mentioned causes of inaccuracies, that is to say, structure for overcoming the inaccuracies due to leakage resistance and contact resistance.

Ceramic seals, hard rubber and Bakelite panels are normally employed in prior art reference decade standards as insulation material, in particular, as the panels upon which the conductive elements of the standard are mounted. Consider, as an example, a typical prior art standard employing ten resistors each of 10K ohms in value. Assume five of said resistors connected in series to form a first branch and the other five resistors connected in series to provide a second branch. When these two branches are connected in parallel, they provide a reference standard of 25,000 ohms. Assume one end of the parallel combination is grounded. Under the conditions as heretofore prevailing in the art, a leakage resistance or leakage current path to ground exists at each terminal connection of the ten resistors. The leakage resistance at each terminal has been ascertained to be in the order of one million megohms. Since the ten terminals are in parallel to ground, the foregoing amounts to a leakage path of 100,000 megohms in parallel with 25,000 ohms. This produces a one part in four million approximate error in the reference standard due to leakage resistance.

In considering a reference standard of very low value of resistance, it is well-known in the art that the magnitude of the various contact resistances employed in a decade standard, in particular, when connecting the resistors in parallel to achieve a low resistance standard, become increasingly troublesome particularly when one attempts to achieve accuracies and precision within one part of ten million or better.

It is, therefore, the principal object of the instant invention to provide a novel resistance and conductance reference decade standard, wherein precision and stability inaccuracies due to spurious leakage resistances and spurious contact resistances are eliminated or substantially minimized so as to achieve accuracies better than one part in ten million.

It is a further object of the invention to provide a resistance and conductance decade standard, wherein the individual resistors of the standard are connected to conductive plug blocks, which blocks are raised in air with respect to the supporting insulation panel by slender cylindrical mounting structures in order to suppress spurious leakage current paths.

It is a further object of the invention to provide in a resistance-conductance decade standard an insulation mounting structure for the individual resistances constituting the standard and for the conductive plug blocks to which said resistors are connected, wherein said structure is substantially isolated by an air gap from the outer housing and from ground connections so as to suppress spurious leakage current paths to such housing and ground connections.

It is a further object of the invention to provide in a resistance-conductance decade standard a novel geometric pattern of conductive plug blocks and correlated conductive trunk strips and terminal strips in order to provide a multitude of different series-parallel connections of the resistors so as to achieve a two decade resistance and conductance reference standard including all the cardinal steps of the two decades.

It is a further object of the invention to provide a resistance-conductance decade reference standard including permanent conductive termination plug block connections between pairs of adjacent resistors to achieve improved contact resistance characteristics and to provide a novel split plug connector for connecting to the conductive plug blocks thereof to effect voltage-current four terminal connections for low resistance reference standards also to achieve improved contact resistance characteristics.

Further objects and advantages will become apparent from the following description of the invention taken in conjunction with the figures, in which:

FIG. 5 is a perspective view of the plug blocks, the terminal strips and trunk strips constituting the conductive electrical elements of the standard;

FIG. 6 is a perspective view of the mounting panel depicting the manner in which the resistors are held thereto;

FIG. 7 is an exploded perspective view of a plug connector, one resistor and a pair of plug blocks conductively connected to the respective ends of the resistor;

FIG. 8 is a side elevation of a split plug in accordance with the principles of the invention;

FIG. 9 is a sectional view through line 9—9 of FIG. 8;

Figure 1:
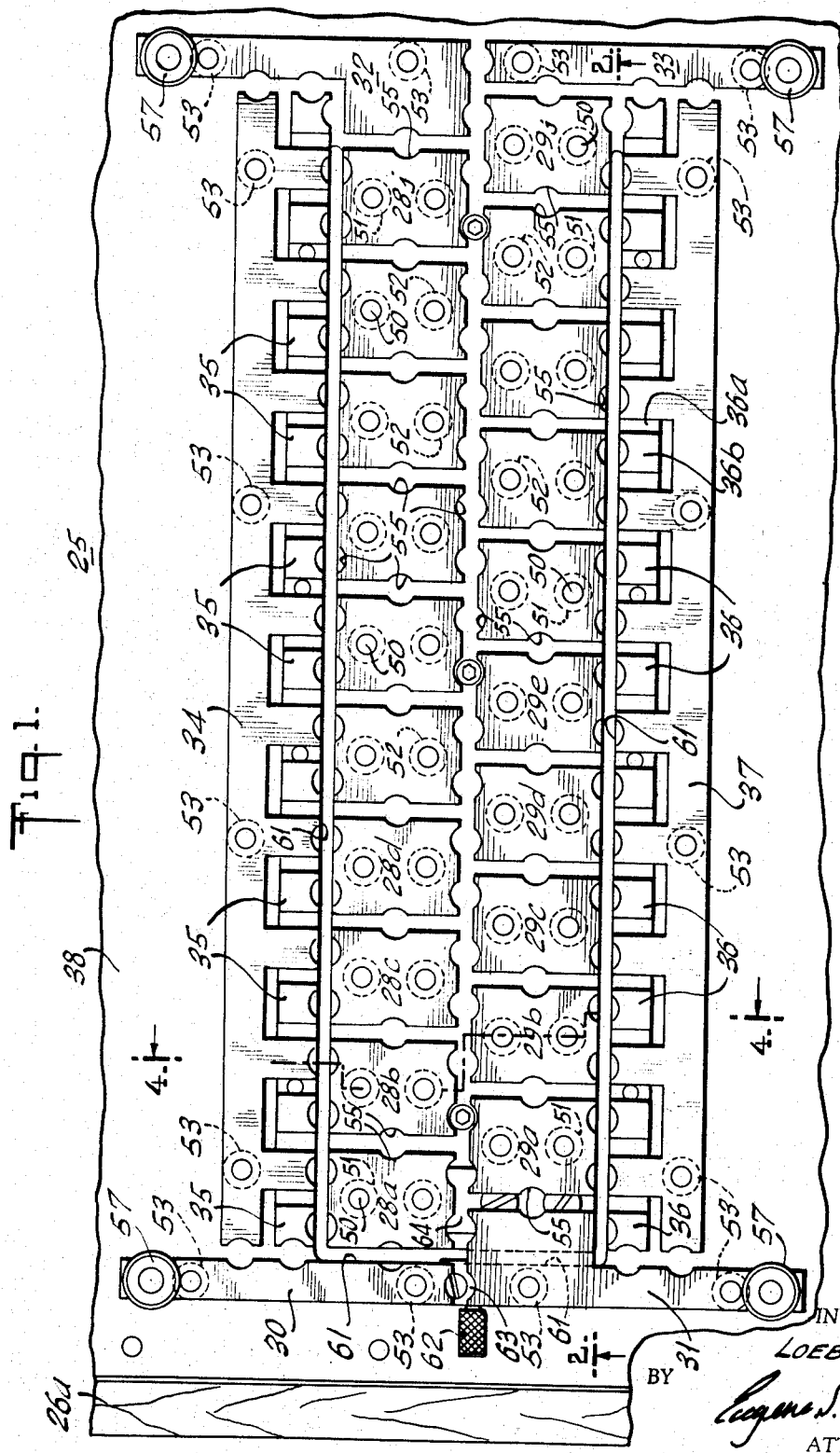
FIG. 1 is a top plan view of a reference standard employing the principles of the invention.
Figure 2:
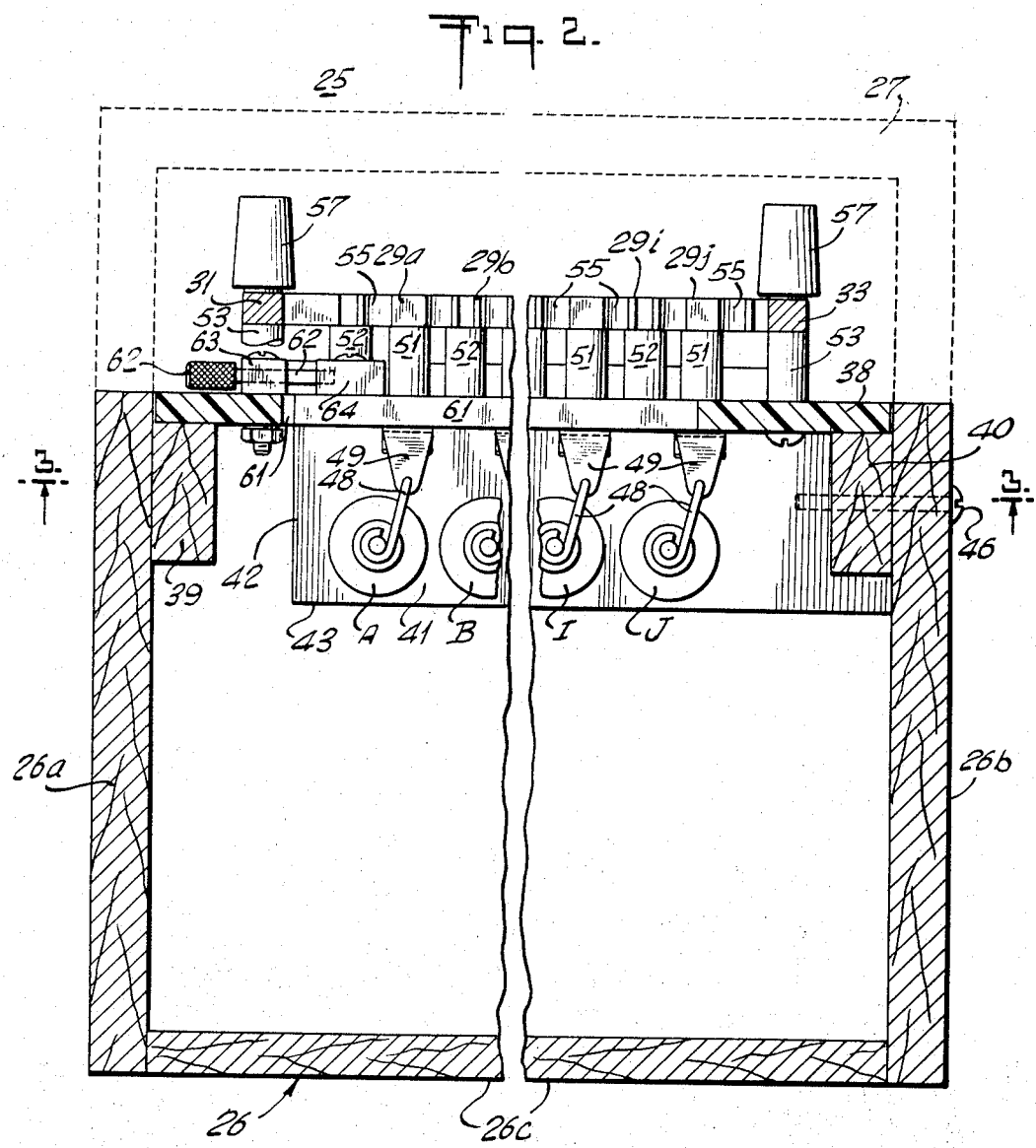
FIG. 2 is a side elevation, partly in section, taken along line 2—2 of FIG. 1.

Reference is made to FIGS. 1 to 7 for an illustrated embodiment of a conductance standard 25 incorporating the principles of the invention. The fixed electrical elements of conductance standard 25 are mounted in a housing 26 made of wood or other suitable material. FIG. 2 shows two side walls 26a, 26b and a bottom wall 26c of housing 26. The top of the electrical elements are enclosed by a removable cover 27 shown in dashed outline in FIG. 2. Standard 25 is portable and may be readily moved from place to place. Furthermore, standard 25 may be quickly put to use upon removal of cover 27 so as to expose the terminals, the trunk strips and plug blocks constituting its electrical elements. Since use of standard 25 contemplates removal of cover 27, the material constituting cover 27 is not critical; in the illustrated embodiment, cover 27 is made of wood.

Twenty conductive plug blocks 28a ... j and 29a ... j, four conductive terminal strips 30 to 33 and four conductive trunk strips 34 to 37 are supported in a substantially horizontal plane by a flat sheet-like support member 38. Support member 38 is made of polystyrene. As seen from FIGS. 2 and 6, the four sides of member 38 sit on wood ledges such as 39, 40. These support ledges 39, 40 are secured to the adjacent housing walls. Support member 38 includes a depending vertical flat portion 41 of suitable thickness and also made of polystyrene. Polystyrene member 41 depends into the interior of housing 26. Member 41 has side and bottom edges 42, 43 spaced from the housing walls (note FIG. 2). Along the right side, as seen in FIG. 2, member 41 has an edge portion secured to the housing by a screwbolt 46.

Ten mutually spaced resistors A, B ... I, J are supported by vertical member 41. The outer casings of the resistors snugly nest in mounting holes provided in member 41. From FIGS. 2 and 4, two terminal leads 47, 48 from each resistor extend upwardly along opposite sides of member 41. These terminal leads 47, 48 also function to support and hold resistors A, B ... I, J in their respective mounted positions. Each terminal lead is soldered to a conductive terminal lug 49. The individual terminal lugs 49 are in electrical contact with and secured by respective conductive screw-bolts 50 to the underneath face of member 38. Bolts 50 extend upwardly through member 38, through respective upstanding cylindrical-shaped and hollow conductive columns 51, whereby the ends of bolts 50 thread to respective ones of the plug blocks. By the foregoing arrangement, each resistor end conductively connects to a respective plug block. For example, the opposite ends of resistor A connect to blocks 28a, 29a, respectively; the opposite ends of resistor B connect to blocks 28b, 29b, respectively; the opposite ends of resistor C connect to blocks 28c, 29c, respectively, and so on.

Each plug block is also supported by a second cylindrical-shaped and hollow conductive column 52 cooperating with the first-mentioned columns 51, to secure the individual plug blocks in a fixed horizontal position spaced a preset distance above the top face of member 38. Similar conductive columns 53 also fixedly secure the four terminal strips 30 to 33 and two of the trunk strips 34 and 37 above the top face of plate member 38. The foregoing structures are secured in a horizontal coplanar relationship by the screw-bolts passing upwardly from the underside of member 38 through the individual columns 51, 52 and 53. The upper ends of these bolts are threadedly attached to the respective terminal strips, trunk strips and blocks. Consequently, plate member 38 and the various conductive elements are provided with preassembled clearance holes and tapped holes for assembly purposes. The top ends of columns 51, 52 and 53 are designed to make good electrical contact with the individual plug blocks and terminal and trunk strips supported by such columns.

Figure 4:
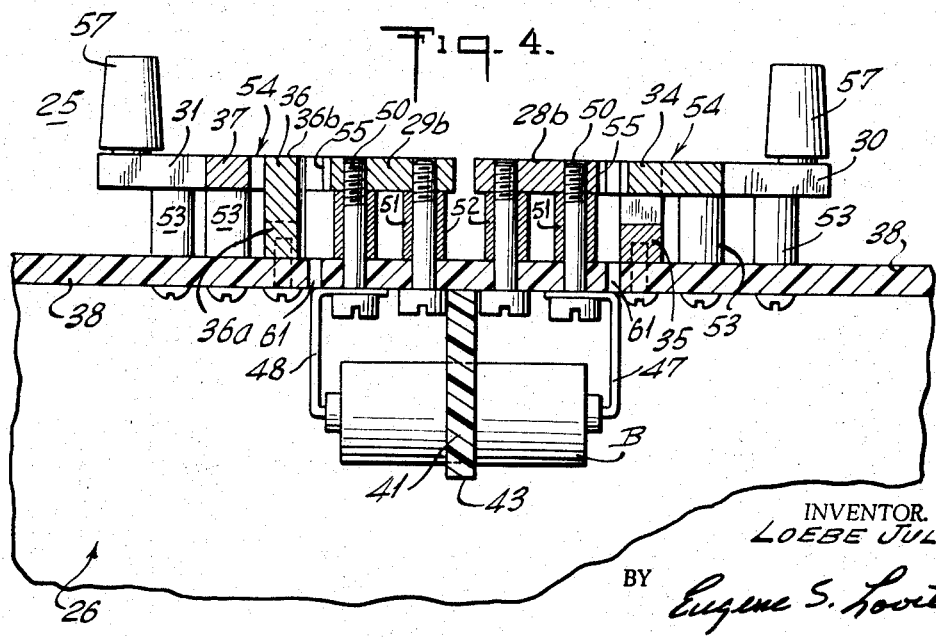
FIG. 4 is a section taken along line 4—4 of FIG. 1.

It is seen that the pair of trunk strips 35, 36 have horizontal extending trunk sections which are bolted directly to the upper face of member 38; note FIG. 5, wherein reference number 36a depicts the horizontal section of strip 36. Upstanding conductive members 36b extend integrally from member 36a, wherein the top faces of members 36b terminate in the horizontal plane common with the plane of the other conducting members; this common plane is depicted in FIG. 4 by reference number 54. Essentially, the section 36a of strip 36 is an electrical common for the individual serrated members 36b. In the horizontal plane 54, upstanding members 36b alternate with lateral extensions of trunk strip 37, whereby any one conductive plug blocks 29a ... j may be conductively connected to either trunk 36 or 37, or to both trunks 36 and 37 by means of conductive plugs to be described hereinafter. The same structural relationship applies to conductive trunk strips 34, 35 on the other side of the apparatus.

It will be understood that all the plug blocks 28a ... j, 29a ... j, the four terminal strips 30 to 33, and the four trunk strips 34 to 37 are made of high conductivity material, for example, brass, and are provided with large contact surfaces and large current flow surfaces so as to maximize the conductivity of these elements. Since the bolts 50, which are connected to lugs 49 and extend through columns 51 to connect to the plug blocks, are part of the electrical circuit, these bolts are also made of good conductive materials, such as brass. For convenience, all bolts employed are alike and made of brass. Plug blocks 28a ... j, 29a ... j are rectangular-shaped and are provided with tapered semi-circular cut-outs 55 along their sides. These tapered cut-outs are opposite similar shaped cut-outs provided in adjacent plug blocks and in the side faces of adjacent trunk strips and terminal strips. Opposed cut-outs 55 form tapered receptacles for receiving conductive plugs 56, see FIG. 7, which may be inserted by hand into any desired plug receptacle. The lower portion of each plug 56 is tapered and uniformly smooth to nest snugly upon insertion into a receptacle. The plug blocks are preset a sufficient height above panel 38 to preclude a plug bottoming or striking against panel 38 upon insertion of the plug in its receptacle. The plugs 56 have large current flow area and make large area contacts upon insertion into a receptacle to minimize contact resistance, and to maximize conductivity. However, the plug fit in a receptacle is not so tight as to prevent removal of a plug by hand. The plugs may be made of brass. The four terminal strips are provided with conventional terminal posts 57 to which lead connections may be made. The use of geometrically large bodies to constitute the foregoing conductive elements is desirable to provide large contact surfaces and large current flow surfaces, whereby the conductive characteristics of the electrical circuit is optimized.

The geometric arrangement of the illustrated electrical elements provides for flexibility of connections, wherein the individual resistors A to J may be connected in series, in parallel and in series-parallel arrangements. As seen from FIGS. 1 through 7, each plug block 28a . . . j and 29a . . . j has six semi-circular cut-outs 55. Each of the six cut-outs is matched by an opposed cut-out 55 of an adjacent conductive element to provide for a receptacle hole in which a tapered plug 56 may be removably inserted. The six plug holes provide a variety of connections between adjacent plug blocks and adjacent terminal and trunk strips. The variety of connections is in part achieved by off-setting each plug block of the 28 group relative to the plug blocks of the 29 group, whereby any one plug block of one group (except for an end block) may be connected to either one or to both of the adjacent blocks of the other group. For example, block 28b may be connected either to block 29a or 29b, or simultaneously to both 29a and 29b. Similarly, block 29c may be connected to 28c or 28d, or simultaneously to both blocks. At one end, block 28a may be connected directly to the individual terminals 30, 31 to either or both of the trunk strips 34, 35 or to block 29a or to the adjacent block 28b. A similar variety of connections may be provided at the other end for block 29j.

Consider a typical one megohm conductance standard 25 containing ten resistors A through J, wherein each resistor has a value of 100K ohms. The connection of plugs 56 into appropriate holes in the plug blocks will provide all the cardinal values through two decades, i.e., ten 10K steps in the lower decade from 10K to 100K and ten 100K steps in the upper decade from 100K to 1000K. With respect to the lower decade steps, the ten resistors connected in parallel provides 10K ohms. Five of the resistors in parallel provide 20K ohms. Connecting three of said resistors in parallel and connecting this combination in parallel with a series combination of three of said resistors provides 30K ohms. Connecting two of said resistors in parallel and connecting this combination in parallel with a series combination of two of said resistors provides 40K ohms. A 50K ohm combination is provided by two of said resistors in parallel. FIG. 13, where R=100K ohms, illustrates the additional combinations to achieve 60K through 90K ohms. The use of a single resistor provides 100K ohms. The upper decade is achieved by connecting the resistors A to J in series, for example, 200K requires two resistors in series; 300K requires three resistors in series, and so on.

Although the foregoing hase been expressed in terms of ohms, it will be realized that conductance standard 25 may be considered as providing a range of two decades of conductances from 1 micromho to 10 micromhos, and from 10 micromhos to 100 micromhos with all cardinal steps of these decades. Since one contemplates using apparatus 25 as a precision standard, it will be understood that each of the resistors A . . . J are characterized by high precision and stability to provide a conductance standard characterized by desired precision-stability tolerances.

Figure 11:
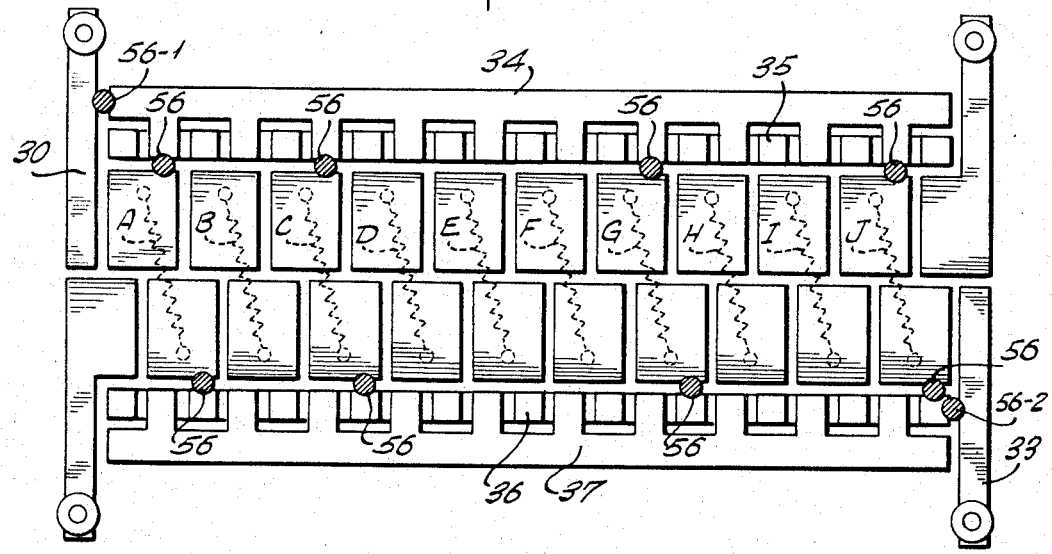
FIG. 11 depicts the apparatus of FIG. 1 illustrating a parallel connection of resistors.

FIG. 11 depicts schematically the use of standard 25 for connecting some of the resistors in parallel. The shaded circles depicts plugs 56. In the arrangement of FIG. 11, terminal 30 is conductively connected to trunk strip 34 by plug 56–1. The four resistors A, C, G and J have their upper ends connected by the four upper plugs 56 to trunk strip 34 to complete one side of the parallel connection. The lower ends of these resistors are conductively connected by the four lower plugs 56 to trunk strip 36 to complete the other side of the parallel connection. Trunk strip 36 is conductively connected to terminal post 33 by the remaining plug 56–2. Resistors B, D, E, F, H and I are inactive in this illustration.

Figure 12:
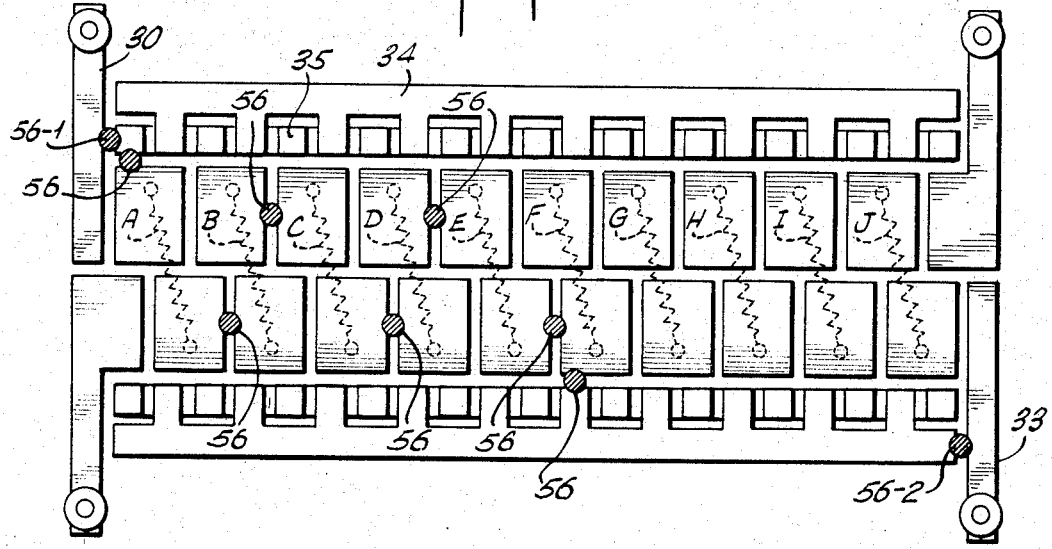
FIG. 12 illustrates the same apparatus for a series connection of resistors.
Figure 13A:
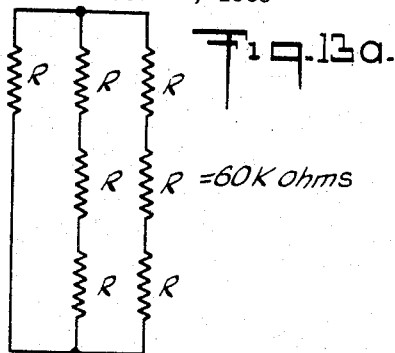
FIG. 13 illustrates schematically connections for providing cardinal values of a particular decade range.
Figure 13B:
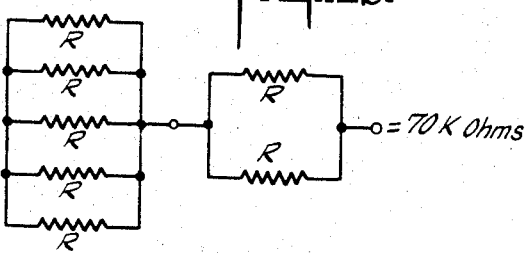
Figure 13C:
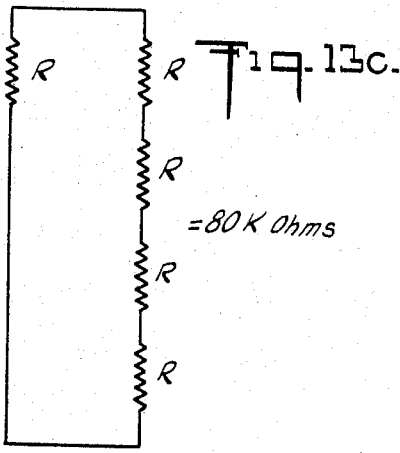
Figure 13D:
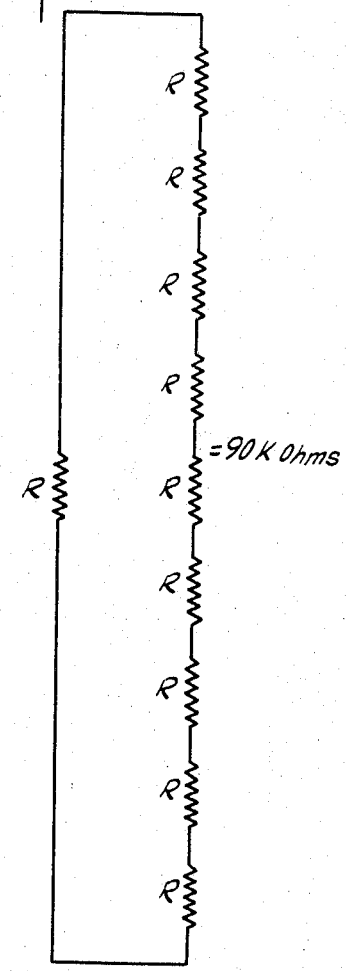

In the schematic illustration of FIG. 12, one can trace out the series connected resistors A, B, C, D and E, wherein one end of the series combination is connected to trunk strip 35, which in turn is connected to terminal 30. The other side of the series combination is connected to trunk strip 37, which in turn is connected to terminal strip 33. In this illustration, the remaining resistors are not actively connected in the circuit.

A basic object of the invention pertains to a structural design directed to reduce leakage paths and thus leakage currents at the terminal ends of the resistors constituting the resistance standard, whereby standard 25 provides resistance values subject to less deviation errors due to such leakage paths. The reduction of leakage paths at the resistor terminals reduces the resistance-conductance error of the apparatus so as to improve the precision of the standard. It is submitted that the effective value of leakage resistance at a resistor terminal is related to the resistivity of the material through which the leakage current conducts; and, further, that the effective value of said leakage resistance is also related to the path dimensions between terminal connections traversed by the leakage current.

Figure 14:
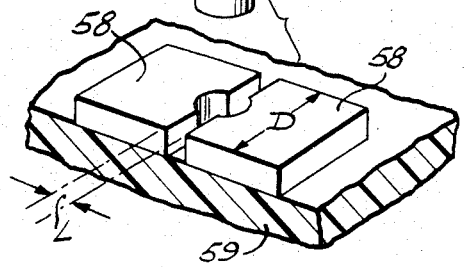
FIG. 14 is employed to explain a prior art structure.

FIG. 14 depicts a conventional conductance standard, wherein plug blocks 58 and the other electrical elements thereof are supported directly on the insulation body or base 59, such as Bakelite or hard rubber. These electrical elements are normally spaced side-by-side a small distance apart, as depicted by dimension L in FIG. 14. The separation L is made small to permit insertion of a plug connector 60 therebetween. It is further submitted that the total leakage current flow is essentially from one plug block to the other through the supporting insulator material 59, whereas the air gap between adjacent plug blocks is essentially a perfect insulator. Recognizing this factor, the leakage resistance $R_L$ is related to the foregoing parameters as follows:

$$R_L = p\frac{L}{D} \quad (1)$$

where $p$ is the resistivity of the insulation material 59. The resistivity of insulation material 59 is a combination of surface resistivity and column resistivity. In the formula, $p$ can represent the combination of column and surface resistivity, or either one considered separately. For a typical prior art arrangement, the dimension D is one inch and the dimension L is ⅛ inch, thus providing an $$R_L = \frac{1p}{8}$$

The essential aspect of this part of the invention is to provide a design, whereby the ratio $L/D$ is materially increased and where the resistivity $p$ is increased.

Figure 15:
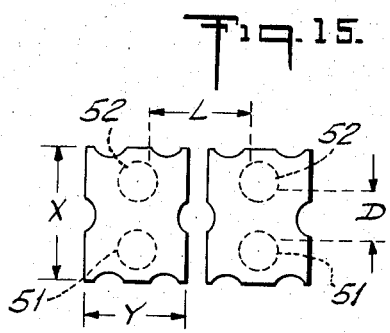
FIG. 15 depicts schematically the structure of the instant invention to show its comparative difference with respect to FIG. 14.

The reduction of leakage paths by the instant invention is achieved in part by supporting the plug blocks 28a . . . j and 29a . . . j in air above the insulator support 38 by means of slender cylindrical spacer columns 51, 52. FIG. 15 illustrates schematically a plan view of this structure. The column diameter is selected to be less than the rectangular dimensions X–Y of the blocks. In employing Equation 1 for this structure, the distance L is now a function of the distance between adjacent faces of correlated cylindrical columns 51, 51 of adjacent blocks and the distance D is now a function of the distance between adjacent faces of a pair of cylindrical columns 51, 52 mounting any one block. For a typical arrangement, $L=⅝$ inch and $D=½$ inch, one achieves a termination leakage resistance of 1¼ $p$. Merely by the arrangement of mounting the plug blocks 28a . . . j and 29a . . . j on pairs of slender columns 51, 52, one achieves reduced termination leakage paths at least by the order of one magnitude in comparison to the prior art structure. A further reduction of leakage paths is achieved by selecting a material characterized by higher resistivity than Bakelite or hard rubber. Consequently, polystyrene is employed in the preferred embodiment for support 38.

The geometrical configuration of the illustrated standard provides additional benefits pertaining to reduction of leakage paths. Consider the schematic illustration of FIG. 16 which shows resistors C, D, E and F connected in series. The connected combination involves a complex array of terminal leakage paths as shown by the numbered lines 1, 2 . . . 6 and 8. Line 1 depicts the leakage path between the ends of each resistor. Line 2 depicts the leakage path between the connected end terminals of adjacent resistors. Line 3 depicts the leakage path from the resistor terminals to the case or frame in which the resistors are mounted and to ground. Lines 4a, 4b and 5a, 5b depict leakage paths from any one resistor terminal to the resistor terminals of all resistors beyond the adjacent resistor. It will be noted that the paths 4a and 5a bow outwardly toward the housing structure, whereas paths 4b and 5b bow inwardly to extend underneath the plug blocks (not shown in FIG. 16). Line 6 depicts the diagonal leakage path between adjacent resistors. Straight and solid line 7 depicts the plug connections for connecting the resistors in series. Line 8 depicts the leakage path between unconnected ends of adjacent resistors.

Leakage path 1 is not of significance since the leakage resistance thereof is included with the actual measured value of the resistor itself. Leakage paths 2 between connected adjacent end of adjacent resistors, which are at a common voltage potential, are of no significance because these paths are shorted out by the plug connections connecting the resistors in series. All of the outwardly bowed leakage paths 4a and 5a are cut and thus eliminated by an air gap 61 depicted in dashed outline and described hereinafter. The inwardly bowed leakage paths 4b and 5b are essentially eliminated by the mechanical structure of the array of spacer columns 51, 52. Columns 51, 52 set up a self-guarding shield which prevents leakage paths of the type depicted as 4b and 5b, whereby these leakage paths are actually pushed back to extend between adjacent end terminals of adjacent resistors as depicted by line 8.

Another unique feature of the foregoing structure relates to the elimination of the outwardly bowed leakage paths 4a, 5a and leakage paths 3 to the case and to ground connections. Since air is a perfect insulater, the design contemplates surrounding the assembly containing the mounted resistors A to J and the column mounted plug blocks 28a . . . j, 29a . . . j by an air gap. The air gap is provided by a milled slot 61 cut through body 38 as clearly shown in FIGS. 3, 4 and 6. In the illustrated embodiment, a ⅛ inch slot 61 extends along three sides to cut and eliminate all leakage paths 4a and 5a that bow outwardly and the leakage paths 3 that would normally extend to the case or ground, except for the very minute amount of paths 3 traversing member 38 along its uncut side. In order to assure the elimination of all outwardly bowed leakage paths, such as 4a, 5a, from any resistor terminal, the two long sides of slot 61 are cut as close as possible to columns 51. These long sides of slot 61 extend between trunk strips 35, 36 and the adjacent columns 51, which columns are conductively connected to the resistor terminals. This is readily seen from the underneath view of FIG. 3, wherein these long sides of slot 61 are brought together as close as possible. As seen from FIG. 3, terminal lugs 49 are contained within slot 61.

Figure 3:
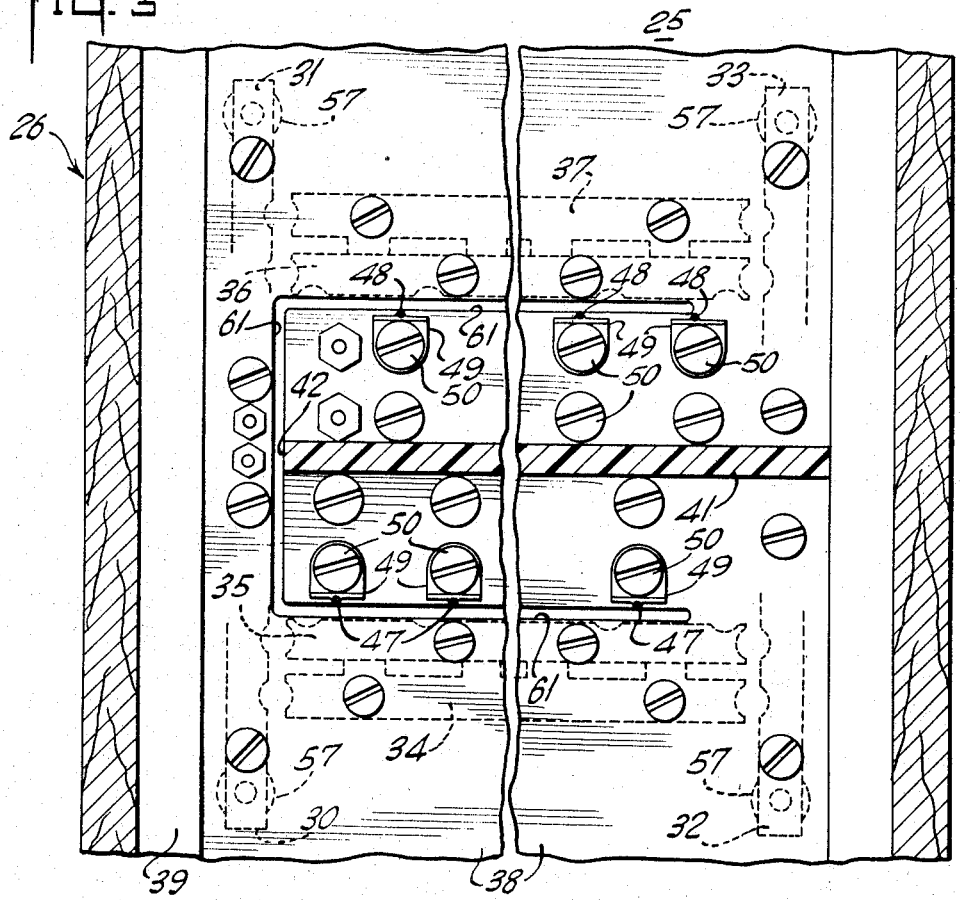
FIG. 3 is a fragmentary bottom view of said apparatus, partly in section, taken along line 3—3 of FIG. 2.

Examination of FIGS. 3, 4 and 6 illustrate that resistors A . . . J and the supporting portions of body 38, including the vertical section 41 thereof, are contained within slot 61, whereas the electrical elements constituting terminal strips 30, 31 and substantially all of trunk strips 34 to 37 lie on the opposite side of slot 61. Examination of the foregoing-mentioned figures in conjunction with FIGS. 1 and 2, illustrate that the amount of leakage traversing the uncut portion of member 38 is negligible although plug blocks 28j and 29j are spaced close to the adjacent terminal strips 32, 33. It can be seen from FIG. 2 that the mounting columns for bodies 28j, 29j, 32 and 33 are spaced a substantial distance apart so as to appreciably minimize the effect of leakage current between these bodies.

The foregoing structural arrangement results in a cantilevered polystyrene section of body 38 arranged to support resistors A through J and the column mounted plug blocks 28a . . . j, 29a . . . j. To provide mechanical support to the cantilevered structure during the time the equipment is not actually being used, a removably insertable pin 62 is designed to extend horizontally through a block 63 and into a second block 64, see FIG. 2. Block 63 is bolted to body 38 to the left of slot 61 as seen in FIG. 2. Block 64 is bolted to the edge of the cantilevered section of body 38. Pin 62 and bodies 63, 64 are electrically isolated from the electrical elements constituting the terminal strips, trunk strips and the resistor circuits. When the equipment is being used, pin 62 is removed from block 64 to avoid shorting the air gap 61 with a leakage path.

Figure 16:
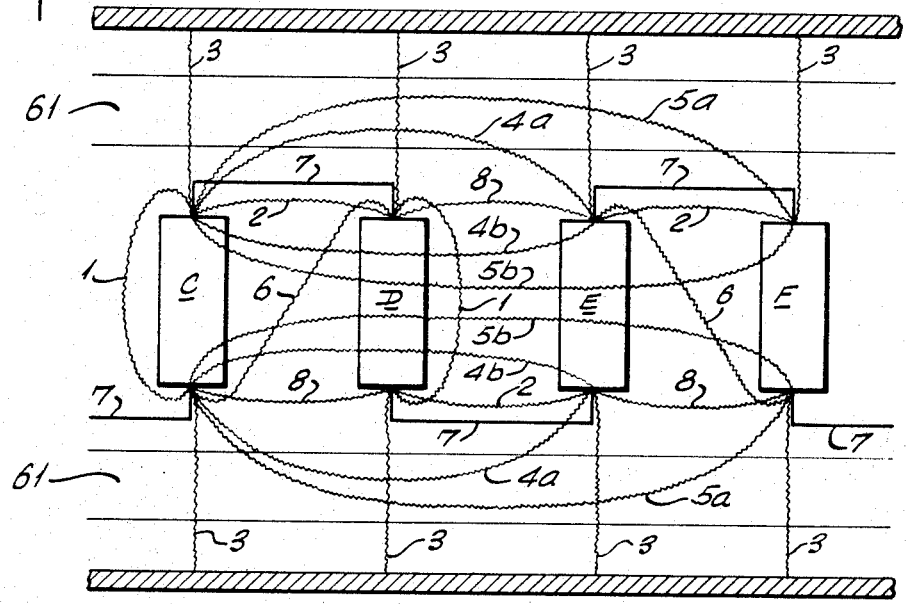
FIG. 16 is a schematic of various leakage paths and is employed herein to facilitate explanation of the invention.

By means of the foregoing described arrangements, such as the use of high resistivity polystyrene material for supporting structures 38, 41, in conjunction with the use of slender spacer columns 51, 52 to raise the mounted plug blocks in air above its supporting structure, plus the shielding effects of the columns 51, 52 which suppress many of the leakage paths and the contribution provided by the air gap 61, the remaining residual leakage paths are those between adjacent unconnected end terminals of adjacent resistors as depicted by lines 6 and 8 in FIG. 16. It will also be understood that leakage current along paths 8 cannot bow outwardly because such paths are cut by slot 61. Errors due to leakage uncertainties when incorporating the principles of the invention herein reduce to less than 0.1 part per million for resistances up to 10 megohms. Comparative measurements between prior art standards and structure incorporating the foregoing described features have indicated resistance leakage improvements in the order of four hundred times. For example, in connecting nine resistors in parallel, a measurement of leakage terminal resistance of the tenth resistor to the adjacent resistance terminal, one of the parallel connected resistors, has indicated a leakage terminal resistance greater than 20,000,000 megohms for a standard incorporating the invention. A similar measurement of prior art structure has indicated a terminal leakage resistance in the order of 50,000 megohms.

Figure 10:
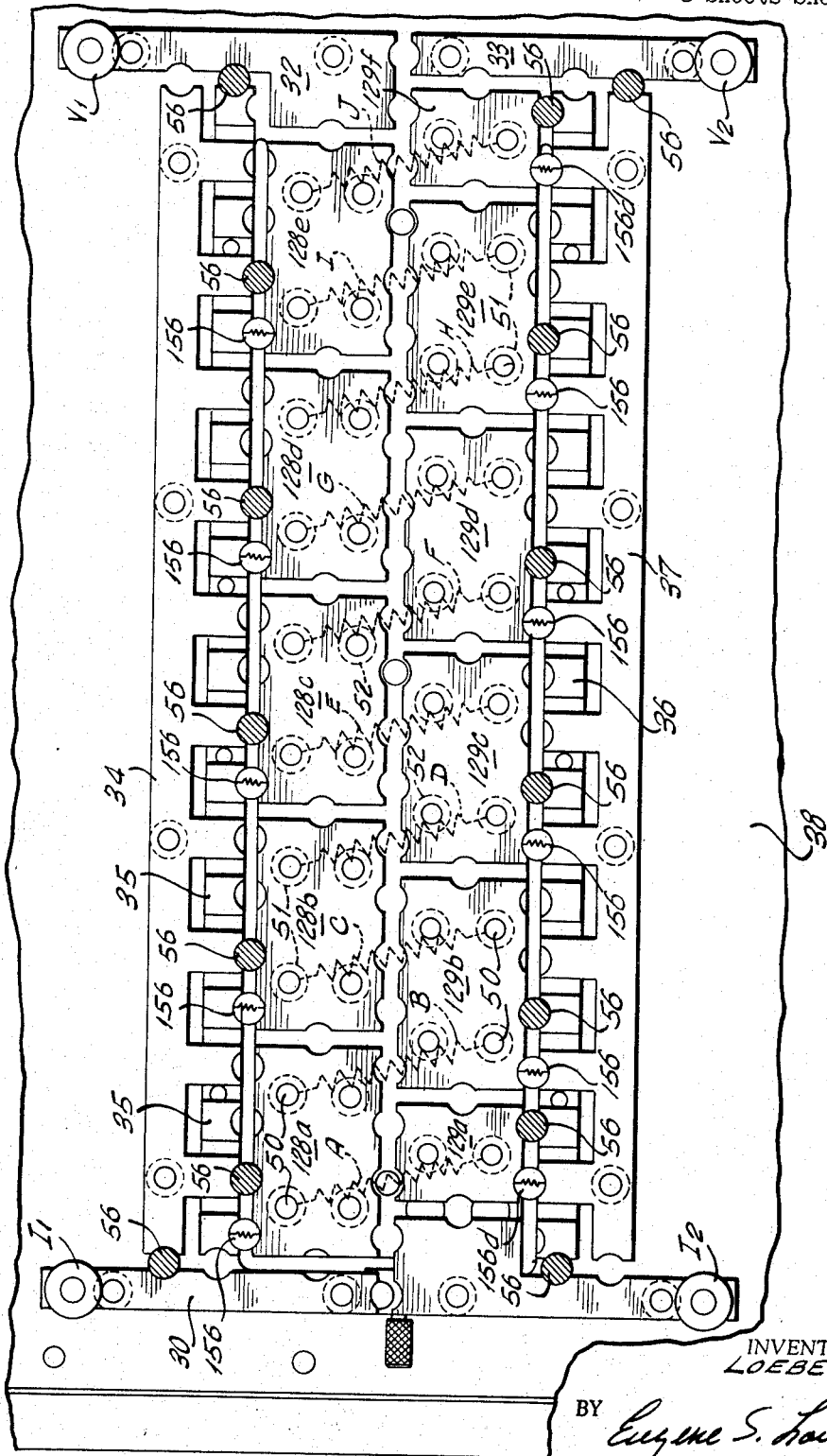
FIG. 10 is a top plan view of a second embodiment of the invention designed to provide low values of resistance.

The foregoing described features are equally effective for standards designed to provide the lower decade range, for example, 1 to 100 ohms by using resistors A . . . J of values 10 ohms each. When the resistances are arranged to provide the low resistance cardinal values, such as 1 or 2 ohms, accuracy errors produced by contact uncertainties become significant, whereas leakage path errors become less significant. The contact resistance problem for a low conductance standard is substantially resolved by the modification depicted in FIG. 10, wherein large area rectangular-shaped plug blocks are employed. The structure of the standard illustrated in FIG. 10 is substantially similar to the prior described embodiment except that now there are five large plug blocks 128a . . . e in one group and six plug blocks 129a . . . f in the other group. The end plug blocks 129a and 129f are of half size as compared to the larger intermediate blocks 129b . . . e. The ten resistors A . . . J are mounted in the vertical member 41 as contemplated hereinbefore. However, it will be noted that the upper ends of both resistors A and B are permanently conductively connected to plug block 128a by means of bolts 50 through their respective mounting columns 51, 51. Similarly, the upper ends of both resistors C and D are permanently conductively connected to plug block 128b by means of bolts 50 through their respective mounting columns 51, 51, and so on. On the lower side of the resistors, resistor A is conductively connected to plug block 129a; both resistors B and C are connected permanently to plug block 129b, and so on, until the lower end of the last resistor J connects to block 129j. This arrangement materially reduces the number of insertable plugs 56 required to evolve series, parallel and series-parallel combinations. By eliminating the number of plugs required for the connections, one reduces the sources of contact resistance errors and uncertainties. For example, only two plugs 56 are required to connect the ten resistances in FIG. 10 in series starting at the lower end of resistance A and ending at the lower end of resistance J. One plug 56 is used to connect block 129a to terminal 31 and one plug 56 is used to connect block 129f to terminal 33. All the other connections are automatically provided by the fact that the ends of adjacent pairs of resistors are connected permanently to respective large area plug blocks. Eleven plugs 56 are required for a parallel combination of the ten resistors. Five plugs 56 are used to connect the upper plug blocks 128a . . . e to one of the upper terminals 30 or 32, and six plugs 56 are used to connect the lower blocks to one of the lower terminals 31 or 33.

Figure 17:
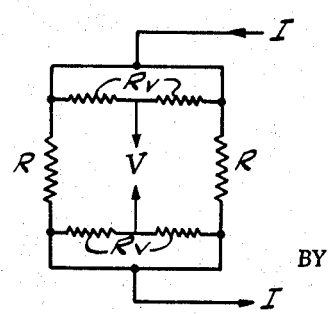
FIG. 17 depicts schematically a four terminal voltage current connection of parallel resistors.

When working with extremely low values of standard resistance, it is now customary in the art to use four terminal connections as propounded by Wenner of the National Bureau of Standards. This technique contemplates using one pair of terminals for the current connections and a separate pair of terminals for the voltage connections in order to achieve high accuracies for resistances of low values. The Wenner arrangement essentially holds that when two or more standard resistors R, note FIG. 17, are connected in parallel, the voltage connections to resistors R are made through voltage resistors $R_v$, whereas separate connections are employed for current connections and that value of the voltage resistors must be in the same proportion as the values of the parallel connected resistors R. Hence, when the value of the resistances R are the same, then the value of the voltage resistances should be the same.

In the low resistance standard of FIG. 10, resistors A through J have the same value of 10 ohms each. When connecting such resistors in parallel, solid plugs 56 may be used for the current connections. Since these resistors are of the same value, in accordance with the Wenner theory, the voltage connections require voltage resistors of exactly equal value. When operating with low values of resistance, such as 1, 2 or 3 ohms, a slight plug pressure variation when inserting a plug in its receptacle will reduce the accuracy of the standard for the voltage connection. In order to maintain each of the voltage resistances at equal values and to avoid the effects of plug variations thereto, a split plug 156 as depicted in FIGS. 8 and 9 is employed for the voltage connections.

Split plug 156 is made up of two similar sections 156a, 156b of brass or other conductive material. Sections 156a, 156b are electrically isolated one from the other by a suitable insulator 157, such as resin or the like. The outer faces of the lower portions of sections 156a, 156b are tapered to nest properly in receptacles formed by cut-outs 55. A thin piece of manganin wire 158 is connected electrically across the two half sections 156a, 156b. Each end of wire 158 is conductively secured to a respective section of plug 156. The manganin wire 158 is selected to have a resistance about one hundred times the resistance of a solid plug 56. The solid plug 56 has a resistance of about 0.5 milliohm. The manganin wire of the split plugs serve as the voltage resistances, hence each is carefully selected to have the same resistance of 50 milliohms. Should a plug variation amount to as much as ±5 micro ohms, the voltage resistance across the plug half sections is still substantially constant at a value of 50 milliohms within 1 part per million. When split plug 156 is used, it is oriented for insertion in a receptacle so that the connection between a plug block and the adjacent conductive element is through the manganin wire 158. In other words, split plugs 156 are oriented so that the connection it makes does not short out wire 158.

Figure 18:
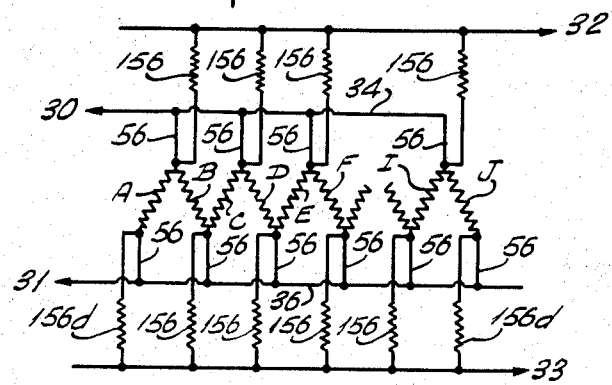
FIG. 18 depicts schematically the circuit achieved by the apparatus depicted in FIG. 10.

FIG. 10 illustrates the use of the four terminal connection to provide a 1 ohm standard by having the ten resistors A . . . J in parallel. The current connections are taken from terminals 30 and 31 through respective trunk strips 34, 36 to the opposite sides of the parallel connected resistors. Each upper plug block is connected to strip 34 and each lower plug block is connected to strip 36. These current connections are made by solid plugs 56 depicted by the shaded circles. Each plug block is also connected to respective strips 35, 37 by split plugs 156. Strips 35, 37 are connected by solid plugs 56 to terminals 32, 33 to which the voltage connections are made. The last two mentioned plugs need not be split plugs, since they are in series with the voltage connection leads. FIG. 18 illustrates schematically the foregoing circuit. It should be noted that the end ones of the lower split plugs 156a, in series with resistors A and J, should be twice the resistance of the other plugs 156.

It is intended that all matter contained in the above description or shown in the accompanying drawings shall be interpreted as illustrative and not in a limiting sense.

What is claimed is:

1. Terminal block structure in an impedance device for reducing terminal leakage current comprising, a pair of adjacent conductive members having confronting faces spaced apart by an air gap, said adjacent conductive members adapted to be joined by conductive plug means, an insulator base having first and second opposite sides, spaced part conductive means carried by said base and attached to said respective adjacent conductive members for supporting said members a set height in air above a first side of said base, said means having along said base confronting faces spaced apart by a gap larger in separation than the first-mentioned gap the two gaps having the same axial direction, an impedance element having a terminal end on the second side of said base, and means below the first side of said base for connecting said terminal end to an individual one of said conductive means, said connection being made through said base, wherein the conductive member supported thereby is a terminal block for the impedance element connected thereto, whereby the terminal leakage path resistance along said base and between said conductive members is relatively increased because it is a function of the separation between the larger of the two gaps.

2. A terminal block structure as defined in claim 1 wherein, the confronting faces of said members having lengths D1, the axial direction of the lengths D1 are the same and are angularly off-set both to the direction of height said members extend above said base and to the direction of the gap separation therebetween, the confronting faces of said means are characterized by a common voltage potential and having effective lengths D2 along said base, the lengths D2 have the same axial direction as lengths D1 and are shorter than the lengths D1, the terminal leakage path resistance along said base and between said conductive members is relatively increased because it is an inverse function of the shorter lengths D2 rather than the longer lengths D1.

3. Terminal block sructure in an impedance device for reducing terminal leakage current comprising, an array of conductive members, adjacent ones of said conductive members having confronting faces spaced apart by an air gap and being adapted to be joined by conductive plug means, an insulator base having first and second opposite sides, spaced apart conductive means carried by said base and attached to said respective adjacent conductive members for supporting said members a set height in air above a first side of said base, said conductive means for adjacent members having along said base confronting faces spaced apart by a gap larger in separation than the first-mentioned gaps between their respective members the two sets of gaps having the same axial direction, impedance elements having terminal ends on the second side of said base, and means below the first side of said base for connecting said terminal ends to an individual one of said conductive means, said connections being made through said base, the conductive members supported thereby are terminal blocks for the impedance elements connected thereto whereby, the terminal leakage path resistance along said base and between adjacent conductive members is relatively increased because it is a function of the separation between the larger of the two gaps associated with adjacent members, said conductive means also serving to suppress inwardly bowed leakage current paths along said base from one impedance terminal end to terminal ends of impedances connected to blocks beyond the block next adjacent the block of said one impedance terminal end.

4. A terminal block structure for an impedance device for reducing terminal leakage current comprising, a housing for containing said impedance device and having sides; an insulator base having opposite first and second sides and supported by said housing a terminal post supported by said base and adapted to be connected to leads; a plurality of spaced apart conductive terminal blocks supported along one side of said base and adapted to be connected by connective plug means, a plurality of impedance elements having terminal ends; and means connecting said impedance terminal ends to correlated ones of said blocks through said base; said base having at least one slot forming an air gap extending in adjacent relationship along a side of said terminal blocks confronting a housing side; said blocks, said connecting means and the terminal ends of said impedance elements being contained within and on one side of a boundary established by the adjacent air gap and said terminal post being supported by said base on the opposite side of said air gap for cutting leakage current paths along said base from individual impedance terminal ends to said housing, and also for cutting leakage current paths along said base from an impedance terminal end to other of said impedance terminal ends which latter paths are outwardly bowed to cross said air gap.

5. A terminal block structure as defined in claim 4 wherein said blocks are positioned successively lengthwise along said base, said slot extends along three outer sides of the lengthwise array of said blocks wherein said blocks are contained within a cantilever like structure surrounded by a three sided air gap confronting sides of said housing.

6. A terminal block structure as defined in claim 5 further including, a first latching member carried by said base at the end of cantilever structure, a second latching member carried by said base on the opposite side of the air gap with respect to said first latching member, and means for selectively joining said latching members at which time the cantilever base structure is supported at its end.

7. An impedance decade standard comprising, a plurality of impedance elements, a plurality of conductive plug blocks, a housing, an insulator base supported by said housing and having first and second opposite sides, conductive columns carried by said base and attached to respective blocks for supporting said blocks a set height in air above a first side of said base, said columns each having a smaller cross-sectional area than the block to which it is attached, said impedance elements having terminal ends on a second side of said base, means including the aforesaid conductive columns and below the first side of said base for connecting the impedance terminal ends through said base to certain ones of said columns wherein the impedance terminal ends are connected to individual ones of said blocks, said base including at least one slot forming an air gap extending in adjacent relationship along sides of the outer block supporting columns, said connecting means including said columns being contained within a boundary defined by the air gap for cutting leakage current paths along said base from individual impedance terminal ends to said housing and ground connections, and also cutting leakage current paths along said base and from individual impedance terminal ends to other of said terminal ends which latter paths are outwardly bowed in a direction to cross said air gap, said conductive columns also serving to suppress inwardly bowed leakage current paths along said base and from one impedance terminal end to terminal ends of impedances connected to blocks beyond the block next adjacent the block of said one impedance terminal end.

8. A decade standard as defined in claim 7 wherein said blocks are positioned successively lengthwise along said base, said slot is U-shaped and extends along three outer sides of the lengthwise array of said blocks and wherein said supporting columns are contained within a cantilever like structure surrounded by a three sided air gap confronting sides of said housing.

9. An impedance reference decade standard comprising, a plurality of individual impedance elements, a plurality of conductive plug blocks, insulator means having first and second opposite sides for supporting said blocks and said impedance elements, said blocks being adjacently spaced apart along the first side of said insulator means in two side-by-side lengthwise arrays for defining two groups of blocks, one terminal end of each impedance element being conductively connected to a plug block of the first group and the other terminal end of each impedance element being conductively connected to a plug block of the second group said impedance elements being supported below said second side of said insulator means, conductive terminal strips supported on the first side of said insulator means, and means including conductive plugs and plug receptacles for interconnecting adjacent ones of said blocks for providing desired series and parallel combinations of said impedance elements, the sides of said blocks having cut-outs coacting with opposed cut-outs in the sides of adjacent blocks for defining individual plug receptacles, the blocks of one group being off-set with respect to the blocks of the other group in the lengthwise dimension of said arrays, wherein a block of one group makes plug receptacles with a pair of adjacent blocks of the other group, wherein said one group block may be conductively connected to adjacent blocks.

10. Apparatus as defined in claim 9, wherein said terminal strips extend along the opposite ends of the block arrays and said strips have cut-outs confronting cut-outs along the sides of the blocks at the ends of said arrays, whereby said end blocks may be conductively connected by said plugs to individual ones of said terminal strips.

11. Apparatus as defined in claim 10 wherein one of said terminal strips at each end of the block arrays has a portion projecting into a clearance created by the lengthwise offset of one group of blocks with respect to the other group of blocks, whereby said one terminal strip may be conductively connected to end blocks of both groups.

12. Apparatus as defined in claim 9 and further including, conductive trunk strips supported by said insulator means on the first side of said insulator means, said conductive trunk strips extending along opposite lengthwise sides of said block arrays, adjacent ones of said trunk strips having serrated projections alternating with each other, a pair of adjacent projections confronting the side of an individual block, and said projections having cut-outs facing block cut-outs, whereby an individual block may be connected to one or both of said adjacent trunk strips.

13. Apparatus as defined in claim 9, wherein said insulator means includes a pair of lengthwise air gap slots extending along the outer opposite lengthwise sides of said block arrays, said blocks being contained within the boundaries defined by said lengthwise slots for cutting leakage current paths from individual resistor end terminals.

14. Apparatus as defined in claim 9 and further including, a plurality of upright conductive columns having opposite ends secured to said insulator means and to correlated ones of said blocks for supporting said blocks in raised relationship with respect to the first side of said insulator means, means including individual ones of said columns for connecting the ends of said impedance elements to individual plug blocks, said impedance elements being supported along a second side of said insulator means opposite its first side, the confronting surfaces of adjacent columns supporting each block defining a first space, the confronting surfaces of correlated columns of adjacent blocks of each group defining a second space, the terminal leakage resistance of an impedance element being a function of a ratio of said first and second spaces, whereby the relative dimensions of said first and second spaces may be selected to achieve an optimum terminal leakage resistance.

15. Apparatus as defined in claim 14 wherein said insulator means include lengthwise air gap slots extending along the opposite outer lengthwise sides of said block arrays, the columns supporting said blocks being contained within the boundaries defined by said lengthwise slots for cutting leakage current paths from individual impedance element end terminals.

16. An impedance reference decade standing comprising, a plurality of individual impedance elements, a plurality of conductive blocks of given suface area, conductive connection means for selectively connecting said blocks to form combinations of resistances, insulator means having first and second opposite sides for supporting said blocks and said elements, said impedance elements being supported below said second side of said insulator means, a plurality of axial upright conductive columns supported on said first side of said insulator means and having opposite ends secured to said insulator means and to correlated ones of said blocks for supporting said blocks in raised relationship with respect to one side of said insulator means, each block being supported by at least one pair of said columns, said blocks being adjacently spaced apart along said one side of said insulator means in two side-by-side lengthwise arrays for defining two groups of blocks, conductive terminal strips supported on the first side of said insulator means, and means including individual ones of said columns for conductively connecting one terminal end of each impedance element to a plug block of the first group and the other terminal end of each impedance element to a plug block of the second group, the confronting surfaces of adjacent columns supporting each block defining a first space, the confronting surfaces of correlated columns of adjacent blocks of each group defining a second space, the terminal leakage resistance of an impedance element being a function of a ratio of said first and second spaces, whereby the relative dimensions of said first and second spaces may be selected to achieve an optimum terminal leakage resistance.

References Cited

UNITED STATES PATENTS

| | | | |
|---|---|---|---|
| 834,953 | 11/1906 | Weiser | 338—77 |
| 1,781,802 | 11/1930 | Bandoly | 338—77 |
| 1,189,931 | 4/1916 | Frohne | 338—77 |
| 2,373,156 | 4/1945 | Wilheim | 338—77 |
| 2,944,237 | 7/1960 | Solow | 338—77 |
| 2,988,722 | 6/1961 | Zabel | 338—239 |
| 3,205,469 | 9/1965 | Frank et al. | 339—18 |

FOREIGN PATENTS

| | | |
|---|---|---|
| 484,381 | 10/1929 | Germany. |
| 20,321 | 9/1900 | Great Britain. |

ROBERT K. SCHAEFER, *Primary Examiner.*

H. HOHAUSER, *Assistant Examiner.*